Patented June 21, 1932

1,864,060

UNITED STATES PATENT OFFICE

WILLIS A. GIBBONS, OF MONTCLAIR, NEW JERSEY, ASSIGNOR TO THE NAUGATUCK CHEMICAL COMPANY, OF NAUGATUCK, CONNECTICUT, A CORPORATION OF CONNECTICUT

PROCESS FOR TREATING RUBBER LATEX AND PRODUCT

No Drawing.   Application filed March 8, 1930.   Serial No. 434,465.

This invention relates to a process for treating rubber latex, and to the product, and is more particularly directed to such treatment of the latex as will produce a rubber of improved characteristics, both in its unvulcanized and vulcanized form.

It is now common to produce rubber from latex by dehydration methods, more particularly by spray drying, in which substantially the entire solid content of the latex is recovered in dry form. Such rubber shows many improved properties over rubber obtained by the usual coagulating methods, and among such improved properties are great strength and more rapid vulcanization. The present invention is concerned with a method of further improving the physical characteristics of rubbers prepared by the evaporation of latex, and among others improving the milling characteristics of the unvulcanized rubber, so that it may be obtained in a smooth plastic form suitable for the various rubber manufacturing operations with a minimum expenditure of time and power, while maintaining the strength and other desirable properties which are natural attributes of the evaporated rubbers. It also aims to improve the physical characteristics of the vulcanized rubber product, and more particularly its flexing ability, especially when combined with fibrous material. The invention is also applicable to an artificial latex.

Broadly, the invention comprises a method of forming a rubber of improved physical characteristics, both in its unvulcanized and vulcanized form, by incorporating in latex an easily hydrolyzable salt of a volatile acid and a volatile base in quantity sufficient to impart a pH adjacent to or below neutrality to the water extract of the rubber obtained by evaporating the latex, and then evaporating the latex. The invention also includes the product, both in its unvulcanized and vulcanized form, and especially vulcanized products of the rubber and fibrous material.

In carrying out the invention, an easily hydrolyzable salt of a volatile acid and a volatile base is added to rubber latex, and the latex then evaporated, preferably by spray drying. The salt is added in quantity sufficient to impart to the water extract of the resulting rubber a pH adjacent to or below 7. It has been found that rubbers obtained from latex treated in this manner have greatly improved milling characteristics, and they may be broken down on the mill with a minimum expenditure of power and time to produce a uniformly plastic rubber which can be easily calendered, extruded and otherwise handled in the preparation of rubber articles. In general, it has been found that the addition of such salts produces a rubber which requires a somewhat longer time for its optimum cure, and it has been noted that in every case where the salts of the character described have been added, they have greatly increased the flexing ability of the vulcanized rubber, as when the rubber is combined with fibrous material to form tires, hose, belting, etc. Any retarding effect on the cure may be readily overcome in commercial operation by increasing the amount of accelerator.

As a specific example showing the improvement in breakdown secured by the addition of the salts of the character named, there were added to separate batches of latex, ammonium chloride, ammonium bromide, ammonium nitrate and ammonium fluoride, the various batches of latex being then spray dried, along with a batch of latex to which no salt had been added to serve as a blank. The various rubbers thus produced were then tested on the mill for their breakdown time, and after breaking down, portions of each were vulcanized in separate mixes each containing 10 parts of sulphur, to ascertain the optimum cure. The following table gives the results obtained by the addition of the salts named, 1½ parts of the salt to 100 parts of rubber as latex being used in each instance:

| Added salt | Relative break-down time. | Optimum cure (minutes) 10 of sulphur mix. |
|---|---|---|
| None added | 100 | 90 |
| Ammonium chloride | 76 | 165 |
| Ammonium bromide | 90 | 145 |
| Ammonium nitrate | 80 | 145 |
| Ammonium fluoride | 85 | 145 |

With the rubbers thus obtained it will be noted in each case it required a longer period for their optimum cure than in the case of the blank, and it will also be noted that in the case of each rubber to which a salt had been added, it was broken down on the mill in a considerably less time than the blank.

In order to test the flexing ability of the rubbers thus obtained, a rubber mix was made up from the blank containing:

| | |
|---|---|
| Crude rubber | 100 |
| Zinc oxide | 5 |
| Light mineral oil | 5 |
| Heptaldehyde-aniline accelerator | 0.5 |
| Sulphur | 3.75 | and similar mixes where made up using instead the crude rubbers obtained by spray drying latex treated with ammonium nitrate, ammonium fluoride and ammonium chloride. The various rubber mixes were then calendered onto a cord fabric made according to the process disclosed in patent to Hopkinson No. 1,424,020. This fabric consists only of parallel cords which are impregnated with and united by rubber desposited directly from latex. The latex used was compounded with light mineral oil, formaldehyde-ethylamine condensation product, soap and sulphur. After calendering such cord fabric with the respective rubber mixes above described, flexing pads were made up by plying six plies of the calendered fabric with the cords in adjacent plies running at right angles. The pads were cut to a size 5" x 8", vulcanized in a mold, allowed to stand for 36 hours and then cut into strips 1" x 8". These strips were subjected to a flexing test in which each strip was secured in a machine by its ends while the intermediate portion of the strip was in contact with a weighted pulley carrying a weight of about 100 lbs. The strip was pulled back and forth around the pulley at the rate of 160 cycles per minute until separation of the plies began, and the number of cycles required to cause separation of the rubber from the fabric was noted. These pads are known as flexing pads, and the above test is a standard one used in the manufacture of tires.

The following table gives the results, in kilocycles, of the flexing test for various lengths of cure for a pad made from the blank and for pads made up from spray dried rubber from the latices containing respectively ammonium nitrate, ammonium fluoride and ammonium chloride. The figures in parentheses after the salts, represent the amounts of the salt added per 100 parts of rubber:

*Plain latex (sprayed)*

| Cure @ 45# | Blank | NH₄NO₃(1) | NH₄F(1) | NH₄Cl(.8) |
|---|---|---|---|---|
| 30' | 19.8 | 32.6 | 33.4 | 70.2 |
| 45' | 25.1 | 42.8 | 32.7 | 64.3 |
| 60' | 32.9 | 54.9 | 41.3 | 83.3 |
| 75' | 27.6 | 48.9 | 33.3 | 57.9 |
| 90' | 29.0 | 39.2 | 33.2 | 53.9 |

From the above table it will be seen that in every case there was a marked improvement in the flexing ability of the treated rubbers over that shown by the blank.

The invention is not limited in its application to latices of normal concentration or those containing all of the water solubles of the natural latex, but it may also be applied with marked improvement to concentrated latices, or latices which have been creamed, that is, which have been treated by materials, such as pectin bodies, alginates, and in various other ways to cause a separation of a greater or less proportion of water solubles from the rubber content of the latex. In the following example, such a creamed latex was treated in separate batches with ammonium nitrate, ammonium fluoride, ammonium bromide and ammonium chloride, and the treated batches together with a creamed latex blank were spray dried, compounded as before, made into flexing pads and vulcanized. The following table gives, in kilocycles, the flexing results obtained:

*Creamed latex (sprayed)*

| Cure @ 45# | Blank | NH₄(NO₃)(.2) | NH₄F(.2) | NH₄Br(.2) | NH₄Cl(.2) |
|---|---|---|---|---|---|
| 30' | 29.9 | 53.7 | 40 | 46.8 | 55.7 |
| 45' | 34.3 | 82.4 | 44 | 72.1 | 56.6 |
| 60' | 56.2 | 83.2 | 74.2 | 50.8 | 93.0 |
| 75' | 48.7 | 91.9 | 48.9 | 58.3 | 104.0 |
| 90' | 50.4 | 70.8 | 74.8 | 46.4 | 85.7 |

The specific creamed latex used in the above formula was prepared as described in patent to McGavack, No. 1,740,994, December 24, 1929.

It will be noted that in this case also a very marked improvement was obtained in the case of the pads made up from the rubbers of the treated creamed latex as compared with that from the creamed latex blank.

It will be seen that by the use of my invention, evaporated rubbers are obtained which in their raw condition show marked improvement in their physical qualities over the ordinary spray dried rubber, and when the rubbers obtained by my invention are vulcanized, they show a greatly improved flexing ability. Thus when the vulcanized rubber is combined with fibrous material as in tires, hose, belting, etc., the increase in flexing ability adds greatly to the life of the article, or the same flexing life may be obtained as formerly with the use of a cheaper rubber compound.

Having thus described my invention what I claim and desire to protect by Letters Patent is:

1. Process for treating rubber latex which comprises incorporating with the latex an easily hydrolizable salt of a volatile acid and a volatile base, and manufacturing rubber from the latex by evaporation methods.

2. Process for treating rubber latex which comprises adding to the latex an ammonium salt of a volatile acid, and drying the latex to solid rubber.

3. Process for treating rubber latex which comprises adding to the latex an easily hydrolizable salt of a volatile acid and a volatile base in quantity sufficient to give a rubber the water extract of which has a pH not over approximately 7, and evaporating the latex to form crude rubber.

4. Process for treating rubber latex which comprises adding to the latex a substance selected from the group consisting of ammonium chloride, bromide, fluoride and nitrate, and drying the latex to solid rubber.

5. Process for treating rubber latex which comprises adding to the latex a substance selected from the group consisting of ammonium chloride, bromide, fluoride and nitrate, in quantity sufficient to give a rubber the water extract of which has a pH less than approximately 7, and spray drying the latex.

6. The entire dried product of, rubber latex incorporated with a volatile base salt of a volatile acid, said product having milling and flexing qualities at least equal to those of pale crepe or smoked sheet rubber.

7. The entire dried product of, rubber latex incorporated with an ammonium salt of a volatile acid, the water extract of said product having a pH of not over approximately 7.

8. The entire dried product of, rubber latex incorporated with a substance selected from the group consisting of ammonium chloride, bromide, fluoride and nitrate.

Signed at Passaic, county of Passaic, State of New Jersey, this 5th day of March, 1930.

WILLIS A. GIBBONS.